No. 629,256. Patented July 18, 1899.
F. C. HUSE.
LATHE.
(Application filed Jan. 3, 1899.)
(No Model.) 2 Sheets—Sheet 2.
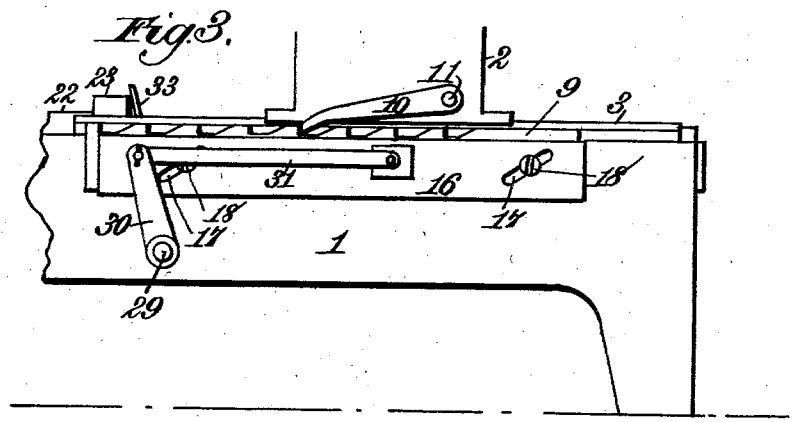
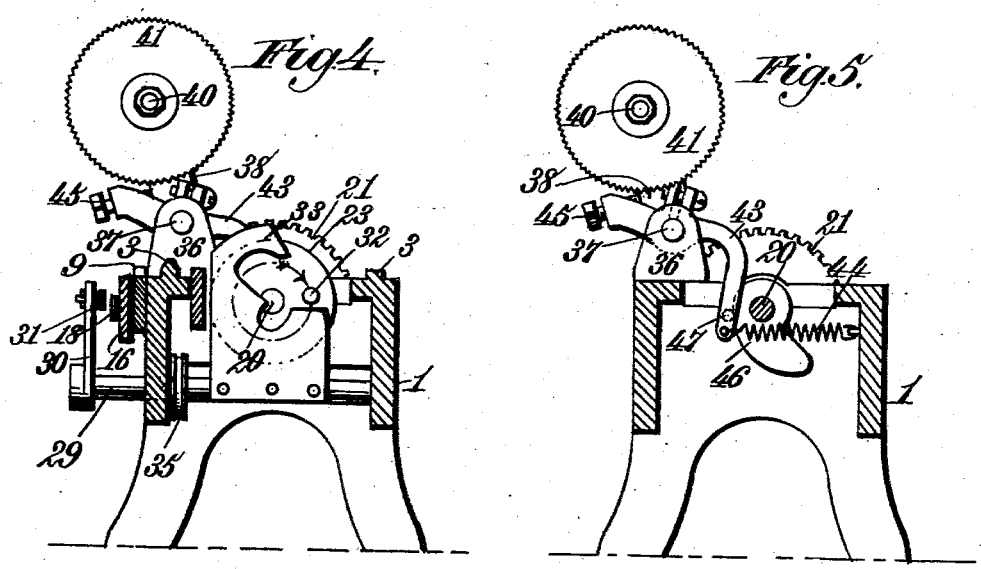
Witnesses.
Robert Everett,
J. B. Keefer
Inventor,
Fred C. Huse.
By James L. Norris
Atty.

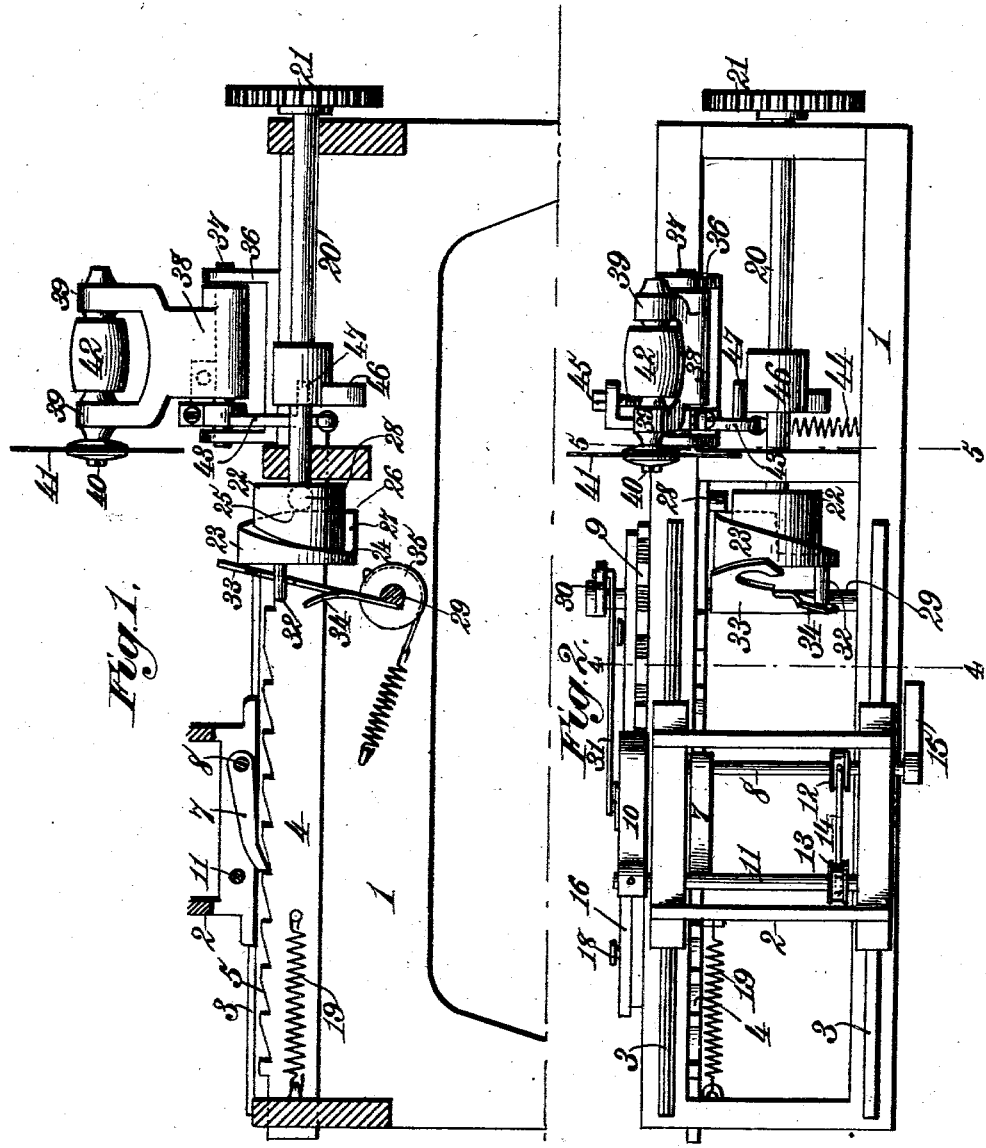

UNITED STATES PATENT OFFICE.

FRED C. HUSE, OF CARREBASSETT, MAINE.

LATHE.

SPECIFICATION forming part of Letters Patent No. 629,256, dated July 18, 1899.

Application filed January 3, 1899. Serial No. 701,014. (No model.)

*To all whom it may concern:*

Be it known that I, FRED C. HUSE, a citizen of the United States, residing at Carrebassett, in the county of Franklin and State of Maine, have invented new and useful Improvements in Lathes, of which the following is a specification.

This invention relates to wood-turning lathes, and has for its object, first, to provide novel mechanism for feeding the carriage carrying the work step by step at accurately-predetermined distances to turn a number of articles from the same piece of stock; second, to provide novel mechanism to cut off the finished articles one by one from the stock as they are turned, and, lastly, to improve and simplify the construction and render more efficient and accurate the operation of this class of machines generally.

To these ends my invention consists in the features and in the novel construction, combination, and arrangement of parts hereinafter described, and particularly pointed out in the claims following the description, reference being had to the accompanying drawings, forming a part of this specification, wherein—

Figure 1 is a vertical longitudinal sectional view of my improved lathe. Fig. 2 is a top plan view thereof. Fig. 3 is a detail view of the mechanism for arresting the forward movement of the carriage. Fig. 4 is a transverse sectional view taken on the line 4 4 of Fig. 2, and Fig. 5 is a similar view on the line 5 5 of the same figure.

Referring to the drawings, the numeral 1 indicates the frame of the lathe, and 2 the sliding carriage traveling upon tracks or ways 3, all constructed in an ordinary or any approved manner. The carriage 2 is provided with usual and well-known means (not shown) for rotatably holding the work or stock to be turned, and any suitable type of turning-knife or tool (also not shown) is provided and properly arranged to turn the articles from the stock.

Arranged to freely reciprocate in suitable bearings at one side of the frame is a rack-bar 4, the teeth 5 of which are arranged on the upper side of the bar, and the distance between each two adjacent teeth is equal to the length of the article to be turned. As shown, the abrupt sides of the teeth face in the direction in which the carriage travels and are adapted to be successively engaged by a pawl 7, fixed on a shaft 8, rotatably mounted in and transversely to the carriage 2. Fixed to the side of the frame 1 is a rack-bar 9, similar in size and shape to the rack-bar 4, but having its teeth arranged reversely to the teeth of said rack-bar 4, and arranged to successively engage the teeth of the rack-bar 9 is a pawl 10, fixed on a shaft 11, mounted transversely in the carriage 2. The shafts 8 and 11 are provided with spools or pulleys 12 and 13, about which is wound a cord or strap 14, and one of said shafts, as 8, is provided with a handle 15, by means of which the shaft is rotated to lift the pawl 7 out of engagement with the rack-bar 4. When the shaft 8 is thus rotated to lift the pawl 7, the cord or strap 14 rotates the shaft 11 and also lifts the pawl 10 out of engagement with the rack-bar 9. Arranged adjacent to and parallel with the rack-bar 9 is a lifter-bar 16. Said lifter-bar is provided with two or more diagonal or rearwardly-inclined slots 17, through which pass pins or projections 18, that are fixed in the sides of the frame 1. It will be evident that when the lifter-bar is moved rearwardly on the pins 18 it will be raised, and, engaging the end of the pawl 10, will raise the latter out of engagement with the rack-bar 9 to permit the carriage to be fed forward, as will more fully hereinafter be explained.

Attached to the rack-bar 4 is one end of a contractile spring 19, the other end of which is attached to the rear end of the frame 1 or to any other suitable fixed support. The spring 19 operates to retract or draw the rack-bar 4 toward the rear end of the frame, and said bar is moved in the reverse direction to feed the carriage forward in the manner and by the means which I will now describe.

Journaled in suitable bearings in the frame 1 is a longitudinal shaft 20, on one end of which is fixed a driving-pulley 21, which may be driven from any suitable source of power. On the opposite end of said shaft is fixed a cam-cylinder 22. On the periphery of the cylinder 22 is formed a cam 23, which from the point 24 to the point 25 is inclined, as shown, and from the point 25 to the point 26 is straight or lies in a plane at a right angle to the axis of the cam-cylinder. Between the end 26 of the straight portion of the cam and the commencement 24 of the inclined portion thereof is formed an abrupt shoulder 27, the face of which is parallel with the axis of the cam-cylinder. On the forward end of the rack-bar 4 is a fixed pin or projection 28, that engages the face of the cam and is held in engagement therewith by the spring 19. Journaled in bearings in the side of the frame is a transverse rock-shaft 29, provided at one end with a crank-arm 30, and to the free end of said crank-arm is fixed one end of a link or connecting-rod 31, the other end of which is connected to the lifter-bar 16. On the end of the cam-cylinder 22 is formed or fixed a pin or projection 32, and fixed on the rock-shaft 29 is a cam-arm 33, having a rearwardly-inclined cam 34. On the rock-shaft 29 is fixed a spring-actuated drum 35, that operates to turn the rock-shaft constantly in a direction to throw the crank-arm 30 toward the saw, and thus move the lifter-bar in the same direction and to also throw the cam-arm 33 toward the cam-cylinder.

The operation of this part of the invention is as follows: The stock from which the articles are to be turned is fixed in position on the carriage 2 in proper position to be engaged by the usual roughing-dies and turning-tool. (Not shown.) Now let it be assumed that the pin or projection 28 on the end of the rack-bar 4 is resting on the cam in rear of the shoulder 27 and that the shaft 20 and the cam-cylinder 22 are rotating in the direction shown by the arrow. Then the inclined portion 24 25 of the cam will engage the pin or projection 28 and will draw the rack-bar 4 forward. The pawl 7 being in engagement with one of the teeth of said rack-bar, the carriage will move forward with the rack-bar the distance of one tooth at each rotation of the cam, thus feeding the stock to the turning knife or tool, which operates to turn the article from the stock. As the pin or projection 28 comes into engagement with the straight portion 25 26 of the cam, the rack-bar 4, and with it the carriage, remains stationary for the purpose hereinafter described, and when the shoulder 27 passes the pin or projection the rack-bar will be instantly retracted by its spring 19 into position to cause another tooth to engage the pawl 7 and feed the carriage forward another step, the carriage being thus fed forward step by step by the teeth of the rack-bar, a complete article being turned out at each step, the distance between the teeth thus determining the length of the articles turned. During that part of the operation in which the pin or projection 28 is riding over the inclined portion of the cam, or as the rack-bar 4 is being moved forward, the pin or projection 32 on the end of the cam-cylinder is bearing against the forward face of the cam-arm 34 and is pressing the latter rearward against the tension of the spring-drum. Hence the crank-arm 30 will be thrown toward the right, holding the lifter-bar 16 elevated, and thus holding the pawl 10 out of engagement with the fixed rack-bar 9, thereby permitting the carriage to feed forward. Before the pin or projection 28, however, moves off from the inclined portion of the cam, the pin or projection 22 will pass from in front of the cam-arm 34, and the spring-drum will immediately rock the rock-shaft to throw the crank-arm 30 to the left, thus drawing forward and lowering the lifter-bar and permitting the pawl 10 to engage one of the teeth on the fixed rack-bar 9. The movement of the carriage is by these means accurately controlled, the pawl 10 and fixed rack-bar preventing the carriage from being moved forward any farther than the exact distance it is moved by the rack-bar 4. Before the cam operates to move the rack-bar forward the inclined cam 34 of the cam-arm is engaged by the pin or projection 32, which operates to rock the rock-shaft and again raise the lifter-bar and lift the pawl 10 out of engagement with the rack-bar 9 in readiness for the next forward movement of the carriage.

At the completion of each article—that is to say, as each article is turned—the cutting-off mechanism is automatically thrown into operation to cut off the finished article, which I will now describe.

Fixed to the side of the frame 1 is a U-shaped bracket 36, in which is journaled a shaft 37, and on said shaft is rigidly fixed the lower end of a relatively broad arm 38, which is forked or bifurcated at its upper end to form two bearings 39. In the bearings 39 is journaled a saw-arbor 40, on one end of which is fixed a circular saw 41, and on said arbor, between the bearings 39, is fixed a drive-pulley 42, which may be driven by any suitable source of power. On one end of the shaft 37 is fixed an arm 43, which at its lower end is attached to one end of a contractile spring 44, the other end of said spring being attached to the frame 1. The opposite or upper end of the arm 43 is bent laterally at a right angle, as shown, and has fitted therein a set-screw 45, the inner end of which takes into the arm 38. On the shaft 20, adjacent to the arm 43, is fixed a cam 46, which, at a certain period during each rotation of the shaft 20, engages and rides over a pin or projection 47 on the arm 43 and rocks the shaft 37, thus throwing the saw in against the work and cutting off the turned article. The cam 46 is so arranged on the shaft 20 that when the pin or projection 28 on the rack-bar 4 engages the straight portion of the cam-cylinder, or, in other words, when the carriage has fed the stock forward one step and is at rest, the cam 46 engages the pin or projection on the arm 43 and moves the saw forward to cut off the article just turned.

By arranging the saw-arbor in the double bearings as described and mounting the pul ley between said bearings the saw will at all times rotate at a true right angle to the turned articles and cut off the latter squarely.

By means of the set-screw 45 the throw or movement of the saw may be regulated to suit the thickness or diameter of the articles being turned, and the saw may also be adjusted up to its work to compensate for the diminished diameter of the saw resulting from sharpening.

It will of course be understood that the articles are successfully turned and cut off from the stock and that the latter is fed forward the distance of one tooth of the rack-bar to each article. By removing the rack-bars and substituting others in which the teeth are arranged at different distances apart articles of different lengths may be turned.

Having described my invention, what I claim is—

1. In a lathe, the combination with the frame and the carriage traveling thereon, of a reciprocating rack-bar, a pawl carried by the carriage in engagement with the rack-bar for imparting a step-by-step movement to the carriage, a fixed rack-bar having its teeth arranged reversely to the teeth on the reciprocating rack-bar, a pawl carried by the carriage and arranged to engage the fixed rack-bar and arrest the movement of the carriage at the end of each forward movement of the reciprocating rack-bar, and means for automatically and alternately raising and lowering said pawl into and out of engagement with the fixed rack-bar at the opposite extremes of the movement of the reciprocating rack-bar, substantially as described.

2. In a lathe, the combination with the frame and the carriage traveling thereon, of a reciprocating rack-bar, a pawl carried by the carriage in engagement with the rack-bar, means for moving said rack-bar forward intermittingly to impart a step-by-step movement to the carriage, a spring for retracting said rack-bar, a fixed rack-bar having its teeth arranged reversely to the teeth on the reciprocating rack-bar, a pawl carried by the carriage and arranged to engage the fixed rack-bar and arrest the movement of the carriage at the end of each forward movement of the reciprocating rack-bar, and means for automatically raising said pawl out of engagement with the fixed rack-bar at the initial portion of each forward movement of the reciprocating rack-bar, substantially as described.

3. In a lathe, the combination with the frame and the carriage traveling thereon, of a reciprocating rack-bar, a pawl carried by the carriage in engagement with the rack-bar, means for moving said rack-bar forward intermittingly to impart a step-by-step movement to the carriage, a spring for retracting said rack-bar, a fixed rack-bar having its teeth arranged reversely to the teeth on the reciprocating rack-bar, a pawl carried by the carriage and arranged to engage the fixed rack-bar and arrest the movement of the carriage at the end of each forward movement of the reciprocating rack-bar, a lifter-bar having rearwardly and upwardly inclined slots, fixed pins or projections passing through said slots, and means for reciprocating said lifter-bar to automatically raise the pawl out of engagement with the fixed rack-bar at the initial portion of each forward movement of the reciprocating rack-bar, substantially as described.

4. In a lathe, the combination with the frame and the carriage traveling thereon, of a reciprocating rack-bar, a pawl carried by the carriage in engagement with the rack-bar, a pin or projection on the rack-bar, a rotary cam arranged to engage said pin or projection and move said rack-bar forward the distance of one tooth at each rotation of the cam to impart a step-by-step movement to the carriage, a spring for retracting the rack-bar, and means actuated by said cam for automatically arresting the movement of the carriage at the completion of each forward movement of the rack-bar, substantially as described.

5. In a lathe, the combination with the frame and the carriage traveling thereon, of a reciprocating rack-bar, a pawl carried by the carriage in engagement with the rack-bar, a pin or projection on the rack-bar, a rotary cam arranged to engage said pin or projection and move the rack-bar forward intermittingly to impart a step-by-step movement to the carriage, a spring for retracting the rack-bar, a fixed rack-bar at one side of the frame, a pawl carried by the carriage arranged to engage the fixed rack-bar, a lifter-bar provided with inclined slots, fixed pins or projections passing through said slots, a rock-shaft, a crank-arm on said shaft, a link attached at one end to said crank-arm and at its other end to the lifter-bar, a cam on the rock-shaft and a projection on the said rotary cam arranged to engage the cam on the rock-shaft and rock the latter to raise the lifter-bar and hold the pawl out of engagement with the fixed rack-bar, substantially as described.

In testimony whereof I have hereunto set my hand in presence of two subscribing witnesses.

FRED C. HUSE.

Witnesses:
SETH E. BEEDY,
ENOCH O. GREENLEAF.